United States Patent
Russo et al.

(10) Patent No.: US 10,127,681 B2
(45) Date of Patent: Nov. 13, 2018

(54) SYSTEMS AND METHODS FOR POINT-BASED IMAGE ALIGNMENT

(71) Applicant: Synaptics Incorporated, San Jose, CA (US)

(72) Inventors: Anthony P. Russo, New York, NY (US); Omar Oreifej, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 260 days.

(21) Appl. No.: 15/199,980

(22) Filed: Jun. 30, 2016

(65) Prior Publication Data

US 2018/0005394 A1    Jan. 4, 2018

(51) Int. Cl.
*G06K 9/00* (2006.01)
*G06T 7/33* (2017.01)

(52) U.S. Cl.
CPC .......... *G06T 7/337* (2017.01); *G06K 9/00013* (2013.01); *G06K 9/00073* (2013.01); *G06K 9/00093* (2013.01)

(58) Field of Classification Search
None
See application file for complete search history.

(56) References Cited

U.S. PATENT DOCUMENTS

| | | |
|---|---|---|
| 4,135,147 A | 1/1979 | Riganati et al. |
| 5,493,621 A | 2/1996 | Matsumura |
| 6,049,621 A | 4/2000 | Jain et al. |
| 6,185,318 B1 | 2/2001 | Jain et al. |
| 6,249,616 B1 | 6/2001 | Hashimoto |
| 6,263,091 B1 | 7/2001 | Jain et al. |

(Continued)

FOREIGN PATENT DOCUMENTS

WO    WO 9307584 A1    4/1993

OTHER PUBLICATIONS

Griaule Biometrics, Minutiae based matching, http://www.griaulebiometrics.com/en-us/book/understanding-biometrics/types/matching/minutiae, downloaded from internet Jul. 8, 2016.

(Continued)

*Primary Examiner* — Sean M Conner
(74) *Attorney, Agent, or Firm* — Leydig, Voit & Mayer, Ltd.

(57) ABSTRACT

Systems and methods for point-based image alignment are disclosed. A method includes: selecting first and second couplets of feature points corresponding to first and second biometric images, respectively, and calculating a rotation-invariant parameter for each of the first and second couplets of feature points; determining that the first couplet matches the second couplet based on a difference between the rotation-invariant parameter for the first couplet of feature points and the rotation-invariant parameter for the second couplet of feature points; determining a candidate transformation operation that aligns the first couplet of feature points to the second couplet of feature points; determining a goodness of fit between a pictorial representation of the first biometric image and a pictorial representation of the second biometric image with the transformation operation applied; and, determining that the candidate transformation aligns the first biometric image to the second biometric image based on the goodness of fit.

16 Claims, 8 Drawing Sheets

(56) References Cited

U.S. PATENT DOCUMENTS

| | | |
|---|---|---|
| 6,289,112 B1 | 9/2001 | Jain et al. |
| 6,314,197 B1 | 11/2001 | Jain et al. |
| 6,487,306 B1 | 11/2002 | Jain et al. |
| 6,668,072 B1 | 12/2003 | Hribernig et al. |
| 7,085,403 B2 | 8/2006 | Ailisto et al. |
| 7,609,866 B2 | 10/2009 | Fujii |
| 7,616,787 B2 | 11/2009 | Boshra |
| 7,809,211 B2 | 10/2010 | Taraba et al. |
| 8,098,906 B2 | 1/2012 | Shuckers et al. |
| 8,300,904 B2 | 10/2012 | Chen et al. |
| 8,358,870 B2 | 1/2013 | Abiko |
| 8,565,497 B2 | 10/2013 | Nada et al. |
| 8,634,604 B2 | 1/2014 | Jahromi |
| 8,723,953 B2 | 5/2014 | Klomp et al. |
| 8,731,251 B2 | 5/2014 | Rosqvist |
| 2003/0007671 A1* | 1/2003 | Ailisto ............... G06K 9/00087 382/124 |
| 2004/0125993 A1 | 7/2004 | Zhao et al. |
| 2008/0273770 A1 | 11/2008 | Kohout |
| 2010/0183230 A1 | 7/2010 | Huang |
| 2012/0224750 A1* | 9/2012 | Rosqvist ............ G06K 9/00093 382/125 |
| 2012/0284284 A1 | 11/2012 | Bringer et al. |

OTHER PUBLICATIONS

Oliveira, et al., "Matching Contours in Images through the use of Curvature, Distance to Centroid and Global Optimization with Order-Preserving Constraint," *Computer Modeling in Engineering and Sciences*, 43(1), pp. 91-110 (2009).

\* cited by examiner

TYPES OF MINUTIA

BRIDGE

DOT

ISOLATED RIDGE

ENDING RIDGE

BIFURCATION

ENCLOSURE

Rotation-invariant parameters:

$\Phi = |\Phi_A - \Phi_B|$
distance d
$\Psi - \Phi_A$
$\Psi - \Phi_B$

SYSTEMS AND METHODS FOR POINT-BASED IMAGE ALIGNMENT

FIELD

This disclosure relates generally to the field of biometrics and, more specifically, to systems and methods for point-based image alignment.

BACKGROUND

Since its inception, biometric sensing technology, such as fingerprint sensing, has revolutionized identification and authentication processes. The ability to capture and store biometric data in a digital file of minimal size has yielded immense benefits in fields such as law enforcement, forensics, and information security.

Utilizing fingerprints in a biometric authentication process typically includes storing one or more fingerprint images captured by a fingerprint sensor as a fingerprint template for later authentication. During the authentication process, a newly acquired fingerprint image is received and compared to the fingerprint template to determine whether there is a match. Before the newly acquired fingerprint image can be compared to the fingerprint template, the newly acquired fingerprint image is aligned by performing a transformation to the newly acquired fingerprint image. The transformation may include one or more of rotation, translation (in two dimensions), and scaling of the newly acquired fingerprint image. This process is known as image alignment.

However, image alignment is a challenging problem when the newly acquired fingerprint image and the template image are low quality or if only a small part of one image overlaps with a sub-part of the other image. With increased use of smaller and smaller image sensors, the amount of overlap among the images is decreasing, which further decreases the effectiveness of conventional image alignment techniques.

In addition, if a minutiae-based technique is used for image alignment or image matching, the use of smaller sensors decreases the number of minutiae points in the images, which decreases even further the effectiveness of conventional image alignment and image matching techniques. For example, some conventional minutiae-based image alignment or image matching techniques are not effective when there are less than about 10 minutiae points in common between the images.

Accordingly, there remains a need in the art for systems and methods for image alignment that address the deficiencies of conventional approaches.

SUMMARY

One embodiment of the disclosure provides a processing system, comprising: a processor; and, a memory storing instructions that, when executed by the processor, cause the processing system to perform the steps of: receiving a first biometric image; receiving a second biometric image; selecting a first couplet of feature points corresponding to the first biometric image; selecting a second couplet of feature points corresponding to the second biometric image; calculating a rotation-invariant parameter for the first couplet of feature points and the second couplet of feature points; determining that the first couplet of feature points matches the second couplet of feature points based on a difference between the rotation-invariant parameter for the first couplet of feature points and the rotation-invariant parameter for the second couplet of feature points; determining a candidate transformation operation that aligns the first couplet of feature points to the second couplet of feature points; determining a goodness of fit between a pictorial representation of the first biometric image and a pictorial representation of the second biometric image with the transformation operation applied; and, determining that the candidate transformation aligns the first biometric image to the second biometric image based on the goodness of fit.

Another embodiment of the disclosure provides a method, comprising: receiving a first biometric image; receiving a second biometric image; selecting a first couplet of feature points corresponding to the first biometric image; selecting a second couplet of feature points corresponding to the second biometric image; calculating a rotation-invariant parameter for the first couplet of feature points and the second couplet of feature points; determining that the first couplet of feature points matches the second couplet of feature points based on a difference between the rotation-invariant parameter for the first couplet of feature points and the rotation-invariant parameter for the second couplet of feature points; determining a candidate transformation operation that aligns the first couplet of feature points to the second couplet of feature points; determining a goodness of fit between a pictorial representation of the first biometric image and a pictorial representation of the second biometric image with the transformation operation applied; and, determining that the candidate transformation aligns the first biometric image to the second biometric image based on the goodness of fit.

Yet another embodiment provides an electronic device, comprising: a fingerprint sensor configured to capture a first image of a fingerprint; a memory storing a second image of a fingerprint; and a processor configured to perform the steps of: receiving a first biometric image; receiving a second biometric image; selecting a first couplet of feature points corresponding to the first biometric image; selecting a second couplet of feature points corresponding to the second biometric image; calculating a rotation-invariant parameter for the first couplet of feature points and the second couplet of feature points; determining that the first couplet of feature points matches the second couplet of feature points based on a difference between the rotation-invariant parameter for the first couplet of feature points and the rotation-invariant parameter for the second couplet of feature points; determining a candidate transformation operation that aligns the first couplet of feature points to the second couplet of feature points; determining a goodness of fit between a pictorial representation of the first biometric image and a pictorial representation of the second biometric image with the transformation operation applied; and, determining that the candidate transformation aligns the first biometric image to the second biometric image based on the goodness of fit.

DETAILED DESCRIPTION

Embodiments of the disclosure provide new systems and methods for point-based image alignment. In some embodiments, the systems and methods are designed to overcome various shortcomings of conventional approaches and work with as few as one minutiae point in common between two images.

One embodiment works as follows. Suppose one wishes to align a first image and a second image. A listing of minutiae points in each image is computed. For each image, then determine couplets of minutiae, which includes all possible pairings of two minutiae within the same image. For each couplet, compute one or more rotation-invariant metrics. Examples include distance between the minutiae in the couplet, minutia angular difference $\Phi = \Phi_A - \Phi_B$, and absolute azimuth angle $\psi$.

Then, for each couplet in the first image, try to find the best matching couplet in the second image based on comparing the rotation-invariant metrics of the couplet in the first image to each couplet in the second image. If a match is found above a certain threshold, compute the transformation that aligns the couplet from the first image to the couplet in the second image, and add the transformation to a list of possible transformations. For a matching pair of couplets, two transformations can be added to the list of possible transformations, i.e., the computed transformation and a transformation flipped by 180 degrees. This process is repeated for each couplet in the first image.

The transformations in the list of possible transformations are then clustered into groups. The groups are sorted by count. Transformation hypotheses associated with groups with too little overlap between the images or too high of an error are at the bottom of the sorted list and may be discarded. The transformations corresponding to the top clusters may then be tested on the images as transformation hypotheses to attempt to align the images. If after applying one of the transformations to the first image, this results in a good fit to the second image, then a transformation is identified that aligns the first and second image and the images can be compared to determine if they are a match. If, however, none of the transformations corresponding to the top clusters results in a good fit, it may be determined that none of these candidate transformations align the first image to the second image.

Figure 1:
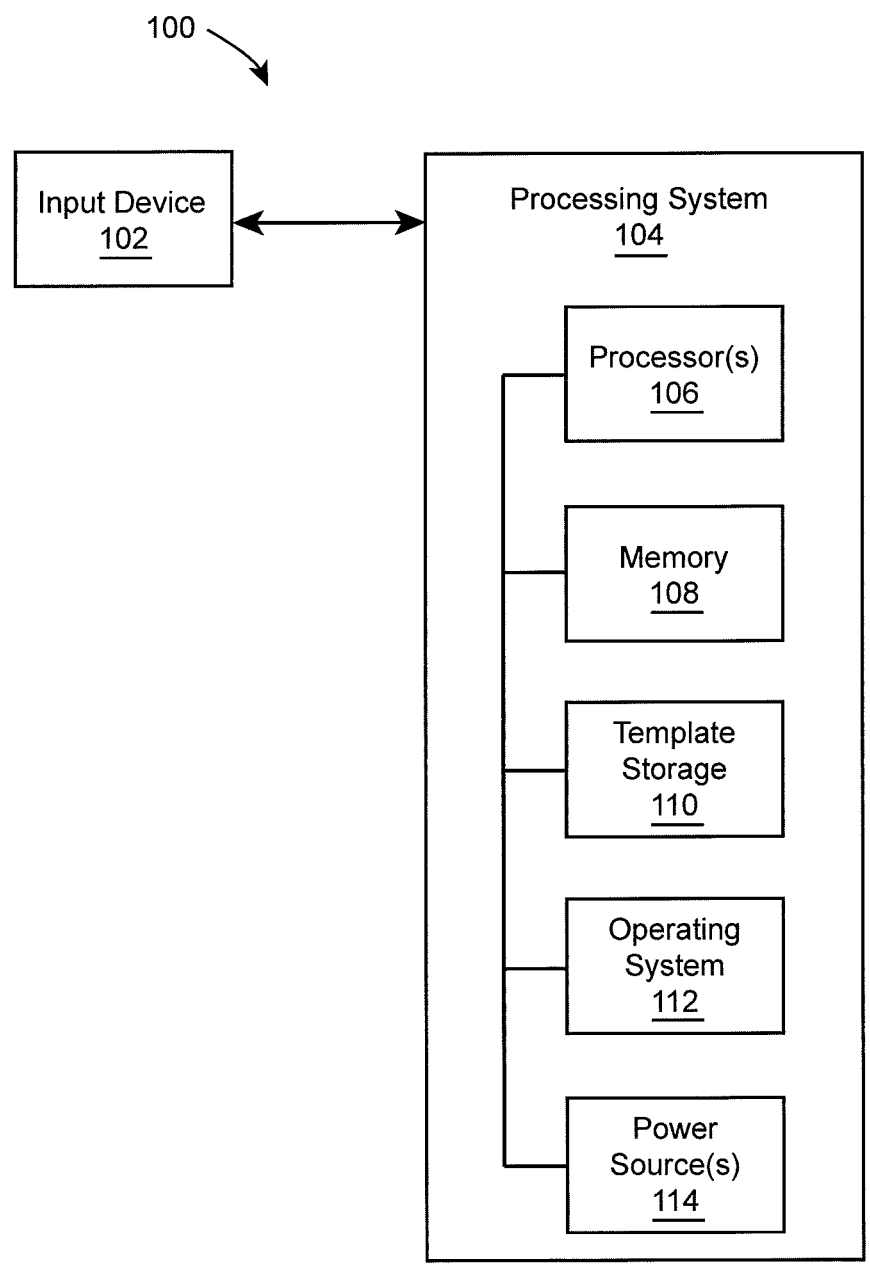
FIG. 1 is a block diagram of an example electronic system that includes an input device and a processing system, according to an embodiment of the disclosure.

Turning now to the figures, FIG. 1 is a block diagram of an example electronic system 100 that includes an input device 102 and a processing system 104, according to an embodiment of the disclosure. The basic functional components of the electronic device 100 utilized during capturing, storing, and validating a biometric authentication attempt are illustrated. The processing system 104 includes a processor(s) 106, a memory 108, a template storage 110, an operating system (OS) 112, and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 are configured to implement functionality and/or process instructions for execution within electronic device 100 and the processing system 104. For example, processor 106 executes instructions stored in memory 108 or instructions stored on template storage 110 to determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110. According to various embodiments, the processor(s) 106 implement hardware and/or software to align two images and compare the aligned images to one another to determine whether there is a match, as described in greater detail below.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Input device 102 can be implemented as a physical part of the electronic system 100, or can be physically separate from the electronic system 100. As appropriate, the input device 102 may communicate with parts of the electronic system 100 using any one or more of the following: buses, networks, and other wired or wireless interconnections. In some embodiments, input device 102 is implemented as a fingerprint sensor and utilizes one or more various electronic fingerprint sensing methods, techniques, and devices to capture a fingerprint image of a user. Input device 102 may utilize any type of technology to capture a biometric corresponding to a user. For example, in certain embodiments, the input device 102 may be an optical, capacitive, thermal, pressure, radio frequency (RF) or ultrasonic sensor.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include composite input devices, such as physical keyboards and separate joysticks or key switches. Further example electronic systems 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

As described in greater detail herein, embodiments of the disclosure provide systems and methods to match a newly acquired image with a template image, such as in the context of fingerprint matching. As part of the image matching process, the newly acquired image is first aligned to the template image.

Figure 2B:
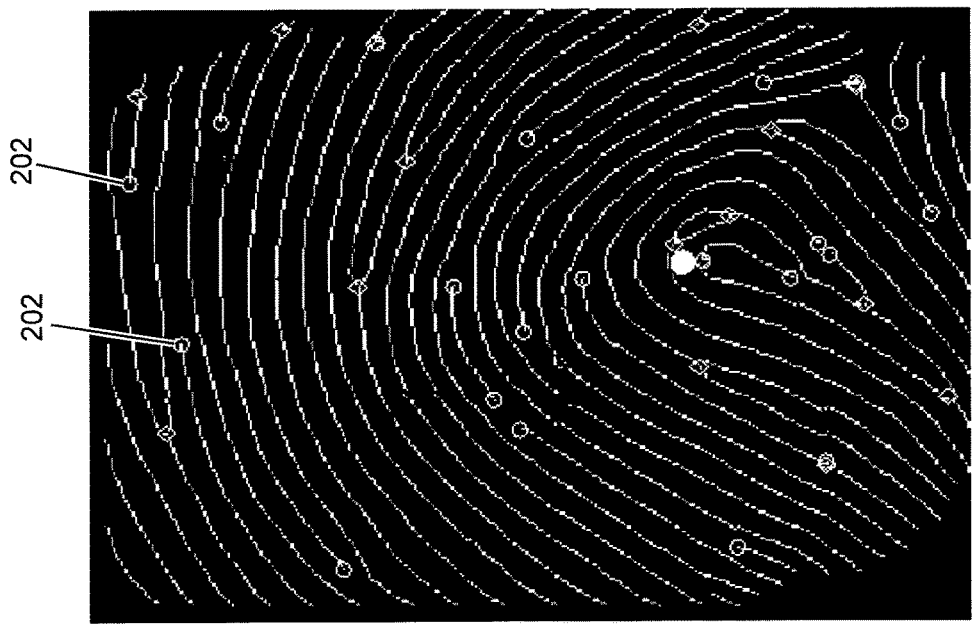
FIG. 2B illustrates a skeletonized version of the grayscale fingerprint image in FIG. 2A, according to one embodiment.
Figure 2A:
FIG. 2A illustrates a grayscale fingerprint image that shows various ridges and minutiae of a fingerprint, according to one embodiment.

FIG. 2A illustrates a grayscale fingerprint image that shows various ridges and minutiae of a fingerprint, according to one embodiment. As can be seen in FIG. 2A, the image is noisy such that portions of the image are cloudy and the ridges or contours are broken. FIG. 2B illustrates a skeletonized version of the grayscale fingerprint image in FIG. 2A, according to one embodiment. Fingerprint skeletonization, also referred to as thinning, is the process of converting the ridge lines in a grayscale fingerprint image (see, for example, the image in FIG. 2A) to a binary representation, and reducing the width of binarized ridge lines to one pixel wide. As can be seen in FIG. 2B, the skeletonized version of the grayscale fingerprint image removes much of the noise so that the image is no longer cloudy and the ridge lines are no longer broken. As also shown in FIG. 2B, certain minutiae points 202 are identified in the skeletonized image.

Figure 3:
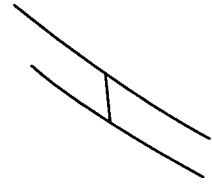
FIG. 3 illustrates various types of fingerprint minutia, according to some embodiments.
Figure 3:
Figure 3:
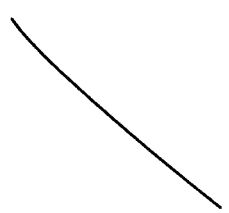
Figure 3:
Figure 3:
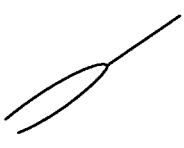
Figure 3:
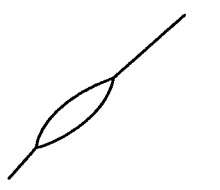
Figure 4A:
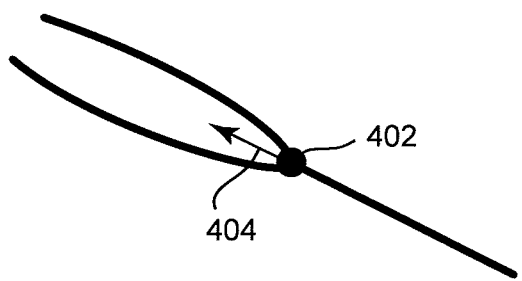
FIGS. 4A-4B are examples of minutia points and corresponding orientation, according to some embodiments.
Figure 4B:
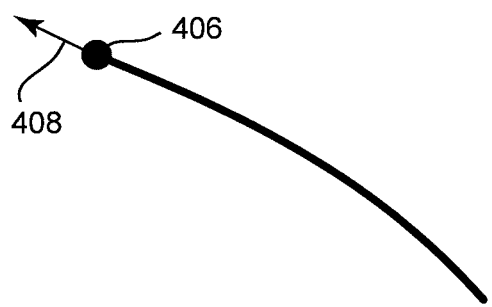

FIG. 3 illustrates various types of fingerprint minutia, according to some embodiments. Examples of fingerprint minutia include: a bridge point between two or more ridges, a dot, an isolated ridge, an ending ridge, a bifurcation point, and an enclosure. Each minutia point in a fingerprint image is associated with a location (in two dimensions) and an orientation. In some embodiments, the orientation of a minutia point corresponds to the tangent of the ridge going through the minutia point. FIG. 4A is an example of a bifurcation minutia point 402 and its orientation 404, according to one embodiment. FIG. 4B is an example of an ending ridge minutia point 406 and its orientation 408, according to one embodiment. Other types of minutia points and other types of features points may be used instead of or in addition to the minutia points described above.

Figure 5:
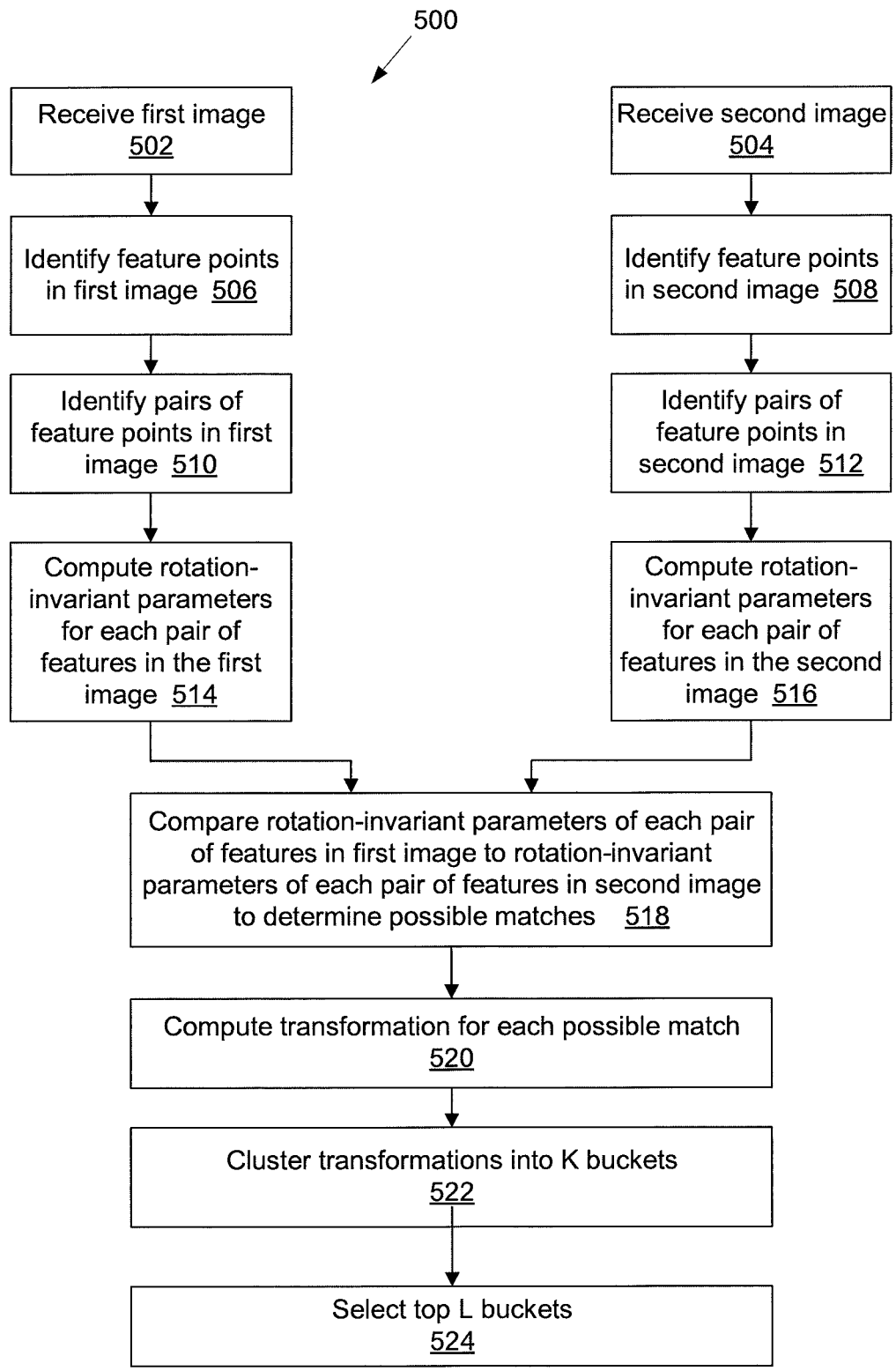
FIG. 5 is a flow diagram of a method for aligning two images, according to one embodiment of the disclosure.

FIG. 5 is a flow diagram of a method 500 for aligning two images, according to one embodiment of the disclosure. At step 502, a processing system receives a first image. At step 504, the processing system receives a second image. In some embodiments, the first image is a newly acquired input image captured by an image sensor, and the second image is a template image that was previously acquired to which the first image is to be compared to determine whether there is a match.

In some embodiments, each of the first and second images can be represented as grayscale images or skeletonized images. As such, appropriate pre-processing (not shown) may be performed to convert a grayscale image, such as a fingerprint image, to a skeletonized image. In some embodiments, converting the second image (i.e., template image) to a skeletonized format is pre-computed by the processing system once and does not need to be recomputed each time that a newly acquired image is presented to compare to the second image.

At step 506, the processing system identifies feature points in the first image. At step 508, the processing system identifies feature points in the second image. Identifying feature points, such as fingerprint minutiae, can be performed in any technically feasible manner.

At step 510, the processing system identifies one or more pairs (also referred to as "couplets") of feature points in the first image. At step 512, the processing system identifies one or more pairs of feature points in the second image. Identifying the pairs of feature points in an image can be done systematically, starting with a first feature point and creating couplets with the other feature points in the image. This process can be repeated for all other feature points, removing duplicates.

At step 514, the processing system computes one or more rotation-invariant parameters of each of the one or more pairs of feature points in the first image. At step 516, the processing system computes one or more rotation-invariant parameters of each of the one or more pairs of feature points in the second image. Example rotation-invariant parameters include a distance between the feature points in the pair, a minutia angular difference $\Phi = \Phi_A - \Phi_B$, and an absolute azimuth angle $\psi$.

Although steps 502/506/510/514 are shown to be performed in parallel with steps 504/508/512/516, in other embodiments, steps 502, 504, 506, 508, 510, 512, 514, 516 can be performed serially or in any technically feasible order. It is further possible that, for example, the sequence of steps 502/506/510/514 be completed entirely before or after the sequence of steps 504/508/512/516.

Figure 6:
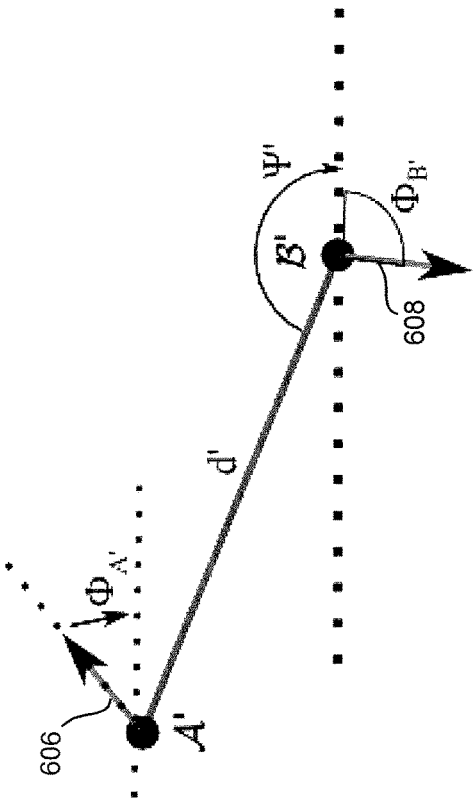
FIG. 6 is a diagram illustrating two pairs of feature points and example rotation-invariant parameters, according to one embodiment of the disclosure.
Figure 6:
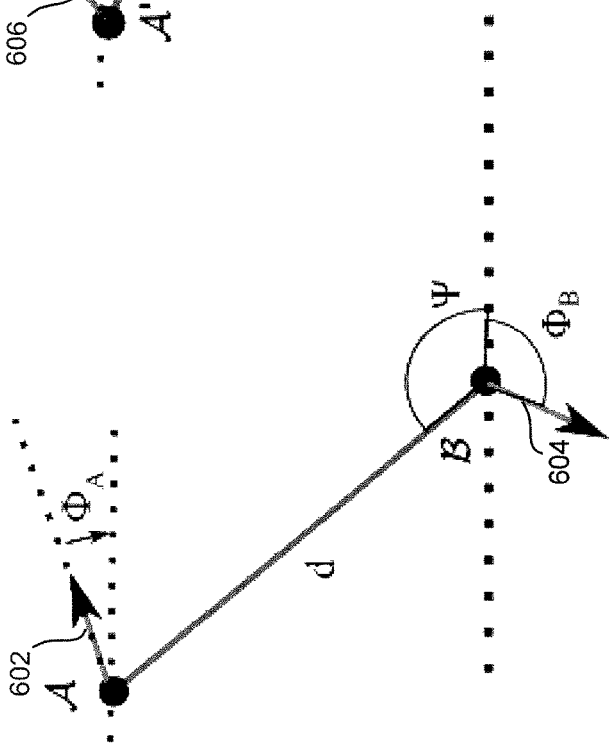

FIG. 6 is a diagram illustrating two pairs of feature points and example rotation-invariant parameters, according to one embodiment of the disclosure. As shown in FIG. 6, Image 1 includes a pair of feature points (A, B) and Image 2 includes a pair of feature points (A', B').

In Image 1, feature points A and B have corresponding orientation 602 and 604, respectively. A distance d can be computed between feature points A and B. An angular difference $\Phi_A$ can be calculated for feature point A between the orientation 602 of feature point A and a horizontal line through feature point A. Similarly, an angular difference $\Phi_B$ can be calculated for feature point B between the orientation 604 of feature point B and a horizontal line through feature point B. An azimuth angle $\psi$ can be computed as the angle of a horizontal line through feature point B (or feature point A) and a line between feature points A and B. Certain rotation-invariant parameters for the pair of feature points (A, B) can be computed, such as angular difference $\Phi = |\Phi_A - \Phi_B|$, distance d, and absolute azimuth angle (i.e., $\psi - \Phi_A$ or $\psi - \Phi_B$).

In Image 2, feature points A' and B' have corresponding orientation 606 and 608, respectively. A distance d' can be computed between feature points A' and B'. An angular difference $\Phi_{A'}$ can be calculated for feature point A' between the orientation 606 of feature point A' and a horizontal line through feature point A'. Similarly, an angular difference $\Phi_{B'}$ can be calculated for feature point B' between the orientation 608 of feature point B' and a horizontal line through feature point B'. An azimuth angle $\psi'$ can be computed as the angle of a horizontal line through feature point B' (or feature point A') and a line between feature points A' and B'. Certain rotation-invariant parameters for the pair of feature points (A', B') can be computed, such as angular difference $\Phi'=|\Phi_{A'}-\Phi_{B'}|$, distance d', and absolute azimuth angle (i.e., $\psi'-\Phi_{A'}$ or $\psi'-\Phi_{B'}$).

If the feature points in the pair in Image 1 are the same as the feature points in the pair in Image 2, but only rotated, then the rotation-invariant parameters for the two pairs would be the same (within a tolerance to account for noise, for example).

Referring back to FIG. 4, at step 518, the processing system compares the rotation-invariant parameters of each couplet in the first image to the rotation-invariant parameters of each couplet in the second image to determine possible couplet-to-couplet matches. According to various embodiments, a couplet in one image is considered a possible match to a couplet in another image if one or more of the rotation-invariant parameters between the couplets are within a tolerance of one another.

In a first embodiment for determining possible matches, each rotation-invariant parameter is checked in order. For example, distance d may be compared first. If the distance d is not within the tolerance, the couplet pairing is discarded as a possible match. If the distance d is within a tolerance between two couplets, then the next rotation-invariant parameter is checked (e.g., angular difference). If the next rotation-invariant parameter is within a tolerance between two couplets, another rotation-invariant parameter is checked, and so on. If each rotation-invariant parameter is within its corresponding tolerance, then a possible match has been found.

In a second embodiment for determining possible matches, each rotation-invariant parameter is checked to determine an error amount corresponding to the respective rotation-invariant parameter. A sum of the error amounts is computed. If the sum of the error amounts is below a total error threshold, then a possible match has been found.

In a third embodiment for determining possible matches, each rotation-invariant parameter is checked to determine an error amount corresponding to the respective rotation-invariant parameter. Each error amount is compared to a threshold error amount corresponding to that particular rotation-invariant parameter. A sum of the error amounts is also computed. If each individual error amount is below its respective threshold and the sum of the error amounts is below a total error threshold, then a possible match has been found.

Other embodiments for determining whether a possible match has been found based on analyzing the rotation-invariant parameters is also within the scope of embodiments of the disclosure.

At step 520, the processing system computes, for each possible couplet-to-couplet match, a transformation T that transforms the couplet from the first image to the couplet from the second image. The transformation can be characterized by an x-translation, a y-translation, and a rotation. In some embodiments, a scale factor may also be included as a transformation parameter. At this stage, single point matches can also be used to generate additional transformation hypotheses At step 522, the processing system clusters the possible couplet-to-couplet matches into K buckets based on the transformation values. If a transformation has values for its x-translation, y-translation, rotation that are within certain thresholds of the x-translation, y-translation, rotation of another transformation, respectively, then those two transformations can be clustered into the same bucket. The processing system may also sort the K buckets by count. At step 524, the processing system selects the top L buckets as possible buckets for transformations that align the first image to the second image.

Each of the top L buckets is then analyzed to determine whether the bucket corresponds to a transformation that aligns the first image to the second image. To test the transformation, the processing system transforms the first image by the transformation associated with a given bucket to align the first image with the second image. Once the first image is aligned with the second image, the processing system determines a goodness of fit between the first image and the second image. Various distance metrics (e.g., similarity measure or difference measure) comparing pictorial representations of the image may be used at this stage, such as the raw image, gray scale image, binarized image, skeletonized image, orientation map, phase map, and the like. One embodiment for determining whether a good fit exists is to compute a chamfer distance between the a skeletonized representation of the first image and a skeletonized representation of the second image (aligned to each other by applying the current transformation candidate) and determine whether the chamfer distance is below a certain threshold. Calculating a chamfer distance comprises computing a measure of dissimilarity between two images. In general, to compute a chamfer distance, the processing system extracts the edge/contours of a query image as well as the edge/contours of a target image, takes one point/pixel of contour in the query image and finds a distance of a closest point/pixel of contour in target image, and computes a sum the distances for all edge points/pixels of query image.

In some embodiments, for a given bucket, the processing system may create additional transformation hypotheses that "wiggle" around the transformation hypothesis corresponding to a given bucket within some tolerance. For example, if a given bucket is associated with x-translation of +4 units, a y-translation of +6 units, and a rotation of +4 degrees (i.e., [+4, +6, +4], as an example shorthand notation), additional "wiggle" transformations can generated for [+4.1, +6.1, +4.1] and [+3.9, +5.9, +3.9], for example (shown using the shorthand notation). The additional wiggle transformations are computed because certain matching algorithms, such as computing chamfer distance, provide better results when there is very tight match between two images.

As mentioned above, once the transformation hypothesis have been determined (plus wiggles) to align the two images, any goodness of fit measurement can be used to determine whether the first image successfully aligns to the second image for the given transformation candidate.

Figure 7:
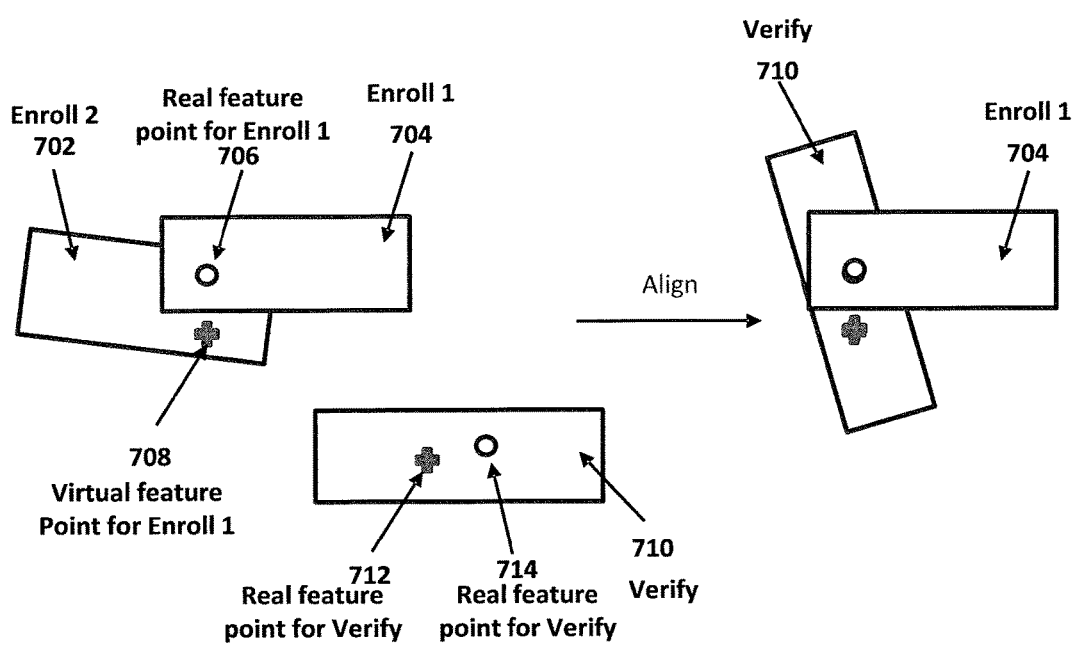
FIG. 7 is illustrates an image alignment technique using virtual minutia, according to an embodiment of the disclosure.

FIG. 7 depicts embodiment block diagram in which "virtual" feature points are used to determine a couplet to facilitate point-based alignment between images, according to one embodiment. Some biometric sensors, such as partial or small area fingerprint sensors, are made small to reduce size and cost, but as a result they may have insufficient sensing area to capture a full image of the biometric. In the case of fingerprint sensors, the sensor may capture only a small area of the fingerprint, which results in fewer minutia points present in the image. Also, this means that the sensor may capture different parts of the fingerprint during different fingerprint verification attempts. To deal with this, the enrollment template for any given fingerprint may be derived from multiple images in order to capture a larger area of the fingerprint and allow the user to match or verify the fingerprint without having to provide the same portion of the finger to the sensor with every attempt. In these cases, it is advantageous to store the enrollment images separately, then relate them together with an enrollment graph that defines their relative transformations. This facilitates matching when a new input image is received and matched to the template, and also avoids problems caused by attempting to physically stitch together or mosaic all of the individual enrollment images together into a larger image (e.g., stitching image artifacts, lost or distorted biometric information caused by blending together overlapping regions).

In this regime, when a new verification image is received and matched against the enrollment template, the verification image typically needs to be aligned to the enrollment images individually in order to determine whether a biometric match exists. In the embodiment shown in FIG. 7, the verification image 710 is aligned to the enrollment image 704 using a couplet-to-couplet pairing of points between the images. In this example, the current enrollment image 704 that is being aligned to the verification image 710 borrows a virtual minutia point 708 from another enrollment image 702 that is located outside of the boundaries of the current enrollment image 702, in order to form a virtual couplet with a real feature point 706 located within the boundaries of the enrollment image 704. Rotation invariant parameters for the virtual couplet, such as the distance between the points or relative angles between points, can be determined from the transformation that relates the two enrollment images 702, 704 together. These parameters can then be compared to the parameters of the real couplet of feature points 712, 714 in the verification image 710, to generate a transformation candidate that is used to align the images. The transformation that relates the enrollment images 702, 704 is typically pre-computed and stored as together with the enrollment template, although it need not be so. Further, while the example of FIG. 7 depicts warping the enrollment image with a single minutia point from a single overlapping enrollment image during the alignment stage to generate a virtual couplet, any number of virtual points from any number of connected enrollment images may be combined with the real feature points within the boundaries of the image to generate couplets. Further, while the connected enrollment image 702 is depicted as overlapping the current enrollment image 704, these images need not overlap to be connected in the enrollment graph or pair for generating a virtual couplet.

Figure 8:
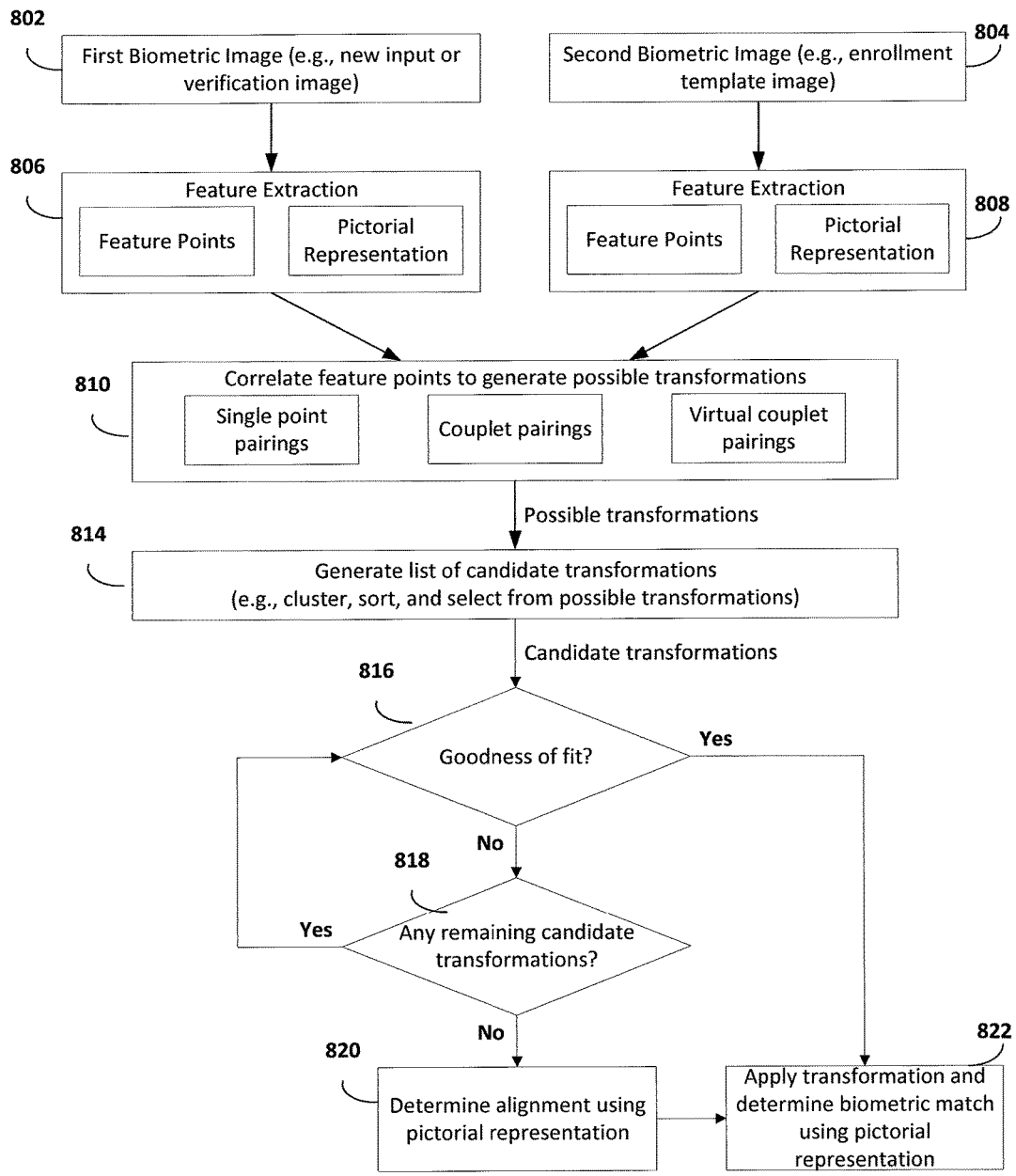
FIG. 8 a flow diagram of a method for aligning two images, according to an embodiment of the disclosure.

FIG. 8 depicts a method of point-based biometric image alignment and subsequent biometric image matching according to an embodiment. In FIG. 8 first and second biometric images are aligned and matched. The method of FIG. 8 uses feature points in the images to generate fast and accurate alignment hypotheses, while it uses the pictorial representations (i.e., pixel level images) are used to determine whether a biometric match exists and test the alignment hypotheses generated from the feature points. The pictorial representations are also used to determine an alignment in the cases where none of the point based transformation candidates result in an accurate alignment (such as cases where there are too few points in the images to determine an accurate alignment based on feature points alone).

At step 802, first biometric image is captured and at step 804 a second biometric image is captured. By way of example, the first biometric image is a new input image or verification image provided for purposes of biometric authentication, and the second biometric image is an enrollment image.

After the first biometric image is captured, at step 806 features for the first biometric image are extracted from the raw first image. After the second biometric image is capture, at step 808 features for the first biometric image are extracted from the raw second image. The extracted features for each image include a set of feature points and a pictorial (i.e., pixel level) representation of the image. Examples of feature points include minutia points in a fingerprint image and other points of interest in face, fingerprint, or other biometric object. Examples of pictorial representations include binarized images, skeleton images, orientation flows, phase maps, and gray scale images.

At step 810, the feature points are used to generate possible transformations based on single point to single point and/or couplet to couplet pairings between the images, which may include virtual couplets as described above with respect to FIG. 7.

At step 814, a list of candidate transformations is generated based on the possible pairings of points between the images. This may include clustering, sorting, and selecting a top number of transformations as described above.

At step 816, the candidate transformations are tested for goodness of fit using the pictorial representations of the images. Each candidate transformation may be tested in order according to their ranking in the list, as shown at 818, until all selected point based hypotheses have been tested. Any suitable distance metric between the pictorial representations of the images may be used, such as chamfer distance between skeleton images, image difference between orientation-based representations (e.g., ridge flows, orientation map, etc.), and the like.

If any candidate transformation results in a sufficient goodness of fit (e.g., the distance metric satisfies a threshold), then the process may proceed to comparing the images to determine whether a biometric match exists, at 822. This may involve further comparison of the pictorial representation of the image, optionally in combination with the set of extract points and/or any of a variety of other features not shown in FIG. 8. If no suitable alignment has been determined after all point-based alignment candidates have been tested, the process may determine an alignment by another means that uses the pixel level data in the pictorial representation of the image, such an exhaustive or pyramid based search.

In addition, although methods above are described in terms of using pairs of feature points ("couplets"), other embodiments can operate on groupings of any number of feature points (for example, three ("triplets"), four, or more features points per group).

Advantageously, embodiments of the disclosure provide an image alignment technique that can operate on relatively small images that have very few feature points. As few as one feature point in common between two images is sufficient in some embodiments.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims)

are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A processing system, comprising:
   a processor; and
   a memory storing instructions that, when executed by the processor, cause the processing system to perform the steps of:
   receiving a first biometric image;
   receiving a second biometric image;
   selecting a first couplet of feature points corresponding to the first biometric image;
   selecting a second couplet of feature points corresponding to the second biometric image;
   calculating a rotation-invariant parameter for the first couplet of feature points and the second couplet of feature points;
   determining that the first couplet of feature points matches the second couplet of feature points based on a difference between the rotation-invariant parameter for the first couplet of feature points and the rotation-invariant parameter for the second couplet of feature points;
   determining a candidate transformation operation that aligns the first couplet of feature points to the second couplet of feature points;
   determining a goodness of fit between a pictorial representation of the first biometric image and a pictorial representation of the second biometric image with the transformation operation applied; and
   determining that the candidate transformation aligns the first biometric image to the second biometric image based on the goodness of fit;
   wherein each feature point in the first couplet of feature points is located within a boundary of the first biometric image, and wherein the second couplet of feature points includes a first feature point located within a boundary of the second biometric image and a second feature point located outside of a boundary of the second biometric image; and
   wherein the first biometric image is a fingerprint verification image and the second biometric image is a first fingerprint enrollment image, wherein first feature point is selected from the first fingerprint enrollment image and the second feature point is selected from a second fingerprint enrollment image captured from a same finger as the first fingerprint enrollment image.

2. The processing system of claim 1, wherein each of the feature points has a respective two-dimensional location and an angle.

3. The processing system of claim 1, wherein the rotation invariant parameter for the second couplet is determined from a transformation between the first fingerprint enrollment image and the second fingerprint enrollment image.

4. The processing system of claim 1, wherein the steps further include:
   identifying a plurality of couplets of feature points corresponding to the first biometric image and a plurality of couplets of feature points corresponding to the second biometric image;
   for each couplet of feature points corresponding to the first biometric image, determining a difference between the rotation invariant parameter for the couplet of feature points corresponding to the first biometric image and the rotation-invariant parameter for each of the couplets of feature points in the second biometric image, wherein if the difference is below a threshold amount for a given couplet of feature points in the first biometric image and a given couplet of feature points in the second biometric image, selecting a transformation operation associated with the given couplet-to-given couplet as a candidate transformation.

5. The processing system of claim 4, wherein the steps further include:
   grouping the candidate transformations into clusters based on parameters of the transformation operations, wherein each of the candidate transformations comprises a translation value, and a rotation value.

6. The processing system of claim 1, wherein the pictorial representations of the first and second biometric images are skeletonized representations, and wherein determining that the candidate transformation aligns the first biometric image to the second biometric image comprises calculating a chamfer distance between the skeletonized representation of the first biometric image and the skeletonized representation of the second biometric image with the transformation operation applied, and determining that the calculated chamfer distance is below a threshold chamfer distance.

7. The processing system of claim 1, wherein the pictorial representations of the first and second biometric images are orientation-based representations, and wherein determining that the candidate transformation aligns the first biometric image to the second biometric image comprises calculating a difference between the orientation-based representation of the first biometric image and the orientation-based representation of the second biometric image with the transformation operation applied, and determining that the calculated difference is below a threshold difference.

8. The processing system of claim 1, wherein determining that the first couplet of feature points matches the second couplet of feature points comprises:
   determining that a first difference between a first rotation-invariant parameter for the first couplet of feature points and a first rotation-invariant parameter for the second couplet of feature points is below a first threshold; and
   determining that a second difference between a second rotation-invariant parameter for the first couplet of feature points and a second rotation-invariant parameter for the second couplet of feature points is below a second threshold.

9. The processing system of claim 1, wherein the rotation-invariant parameter includes a distance between the feature points in the couplet of feature points.

10. The processing system of claim 1, wherein the rotation-invariant parameter includes an angular difference between the feature points in the couplet of feature points.

11. The processing system of claim 1, wherein the rotation invariant parameter for a pair of feature points includes an absolute azimuth angle.

12. The processing system of claim 1, wherein the first and second biometric images comprise fingerprint images, and the feature points comprise minutiae points in the fingerprint images.

13. A method, comprising:
   receiving a first biometric image;
   receiving a second biometric image;
   selecting a first couplet of feature points corresponding to the first biometric image;
   selecting a second couplet of feature points corresponding to the second biometric image;
   calculating a rotation-invariant parameter for the first couplet of feature points and the second couplet of feature points;
   determining that the first couplet of feature points matches the second couplet of feature points based on a difference between the rotation-invariant parameter for the first couplet of feature points and the rotation-invariant parameter for the second couplet of feature points;
   determining a candidate transformation operation that aligns the first couplet of feature points to the second couplet of feature points;
   determining a goodness of fit between a pictorial representation of the first biometric image and a pictorial representation of the second biometric image with the transformation operation applied; and
   determining that the candidate transformation aligns the first biometric image to the second biometric image based on the goodness of fit;
   wherein each feature point in the first couplet of feature points is located within a boundary of the first biometric image, and wherein the second couplet of feature points includes a first feature point located within a boundary of the second biometric image and a second feature point located outside of a boundary of the second biometric image; and
   wherein the first biometric image is a fingerprint verification image and the second biometric image is a first fingerprint enrollment image, wherein first feature point is selected from the first fingerprint enrollment image and the second feature point is selected from a second fingerprint enrollment image captured from a same finger as the first fingerprint enrollment image.

14. The method of claim 13, wherein the rotation invariant parameter for the second couplet is determined from a transformation between the first fingerprint enrollment image and the second fingerprint enrollment image.

15. The method of claim 13, wherein the pictorial representations of the first and second biometric images are skeletonized representations, and wherein determining that the candidate transformation aligns the first biometric image to the second biometric image comprises calculating a chamfer distance between the skeletonized representation of the first biometric image and the skeletonized representation of the second biometric image with the transformation operation applied, and determining that the calculated chamfer distance is below a threshold chamfer distance.

16. An electronic device, comprising:
   a fingerprint sensor configured to capture a first image of a fingerprint;
   a memory storing a second image of a fingerprint; and
   a processor configured to perform the steps of:
      receiving a first biometric image;
      receiving a second biometric image;
      selecting a first couplet of feature points corresponding to the first biometric image;
      selecting a second couplet of feature points corresponding to the second biometric image;
      calculating a rotation-invariant parameter for the first couplet of feature points and the second couplet of feature points;
      determining that the first couplet of feature points matches the second couplet of feature points based on a difference between the rotation-invariant parameter for the first couplet of feature points and the rotation-invariant parameter for the second couplet of feature points;
      determining a candidate transformation operation that aligns the first couplet of feature points to the second couplet of feature points;
      determining a goodness of fit between a pictorial representation of the first biometric image and a pictorial representation of the second biometric image with the transformation operation applied; and
      determining that the candidate transformation aligns the first biometric image to the second biometric image based on the goodness of fit;
   wherein each feature point in the first couplet of feature points is located within a boundary of the first biometric image, and wherein the second couplet of feature points includes a first feature point located within a boundary of the second biometric image and a second feature point located outside of a boundary of the second biometric image; and
   wherein the first biometric image is a fingerprint verification image and the second biometric image is a first fingerprint enrollment image, wherein first feature point is selected from the first fingerprint enrollment image and the second feature point is selected from a second fingerprint enrollment image captured from a same finger as the first fingerprint enrollment image.

* * * * *